United States Patent Office 3,121,701
Patented Feb. 18, 1964

3,121,701
PLASTICISATION OF PARTIALLY HYDROLYSED POLYVINYL ALCOHOL WITH TRIMETHYLOL PROPANE
Richard F. J. Ingleby, 52 Ram Gorse, Harlow, Essex, England
No Drawing. Filed June 12, 1962, Ser. No. 201,753
Claims priority, application Great Britain June 15, 1961
15 Claims. (Cl. 260—33.4)

This invention relates to the plasticisation of "partially hydrolysed" grades of polyvinyl alcohol.

The term "partially hydrolysed" grades of polyvinyl alcohol as used in this specification is intended to mean polyvinyl alcohol in which from 75 to 90 of every 100 acetate groups originally present in the polyvinyl acetate from which the polyvinyl alcohol has been derived have been replaced by hydroxyl groups.

According to the present invention there is provided a composition comprising "a partially hydrolysed" polyvinyl alcohol (as hereinbefore defined) plasticised with trimethylol propane in an amount from about 5 to about 50 parts by weight of trimethylol propane for every 100 parts of the "partially hydrolysed" polyvinyl alcohol.

The permissible limits of the trimethylol propane (2-ethyl-2-hydroxymethyl propane-1,3-diol) are found to vary with the degree of hydrolysis of the polyvinyl alcohol and, while the lower limit may be about 5, it is usually about 10 parts by weight of trimethylol propane for every 100 parts of the "partially hydrolysed" polyvinyl alcohol.

The compositions of the present invention are useful for the manufacture of water-soluble plasticised polyvinyl alcohol film and for the production of articles by blow extrusion and other techniques well known in the art of the hot forming of thermoplastic materials.

The compositions may be dissolved in water for the casting from the resulting solution by well known processes of films and other articles, but, as indicated above, the compositions are particularly suitable for the production of water-soluble plasticised polyvinyl alcohol films and other articles by blow-extrusion and other techniques.

Trimethylol propane has, at elevated temperatures of from 150 to 200° C., a high solvent power for "partially hydrolysed" grades of polyvinyl alcohol (although not as high as that of glycerol), and, at ordinary ambient temperatures, a low plasticisation effect is coupled with a high degree of compatibility with such grades of polyvinyl alcohol. The combination of these properties enables large amounts of trimethylol propane to be added to the polyvinyl alcohol markedly to reduce the temperature at which the viscosity of the melt allows extrusion to be carried out, whilst retaining adequate strength and firmness in the resulting film or other articles.

The low hygroscopicity of trimethylol propane (which is much less than that of glycerol, a plasticiser widely used in cast film), also helps to maintain the strength and firmness of the extruded film under a variety of atmospheric conditions.

Trimethylol propane, being a crystalline material with a melting point of about 55° C., can be dry-blended with the polyvinyl alcohol to be plasticised. This dry-blended material may be used directly for the production of articles by extrusion or compression-moulding, but a superior material may be produced by slowly heating the dry-blended mix whilst keeping it in motion until the melted plasticiser is absorbed by the particles of polyvinyl alcohol. On cooling, there results a uniform, dry, powdery or granular material containing no unincorporated plasticiser. The problem of segregation upon storage and handling of the components of a dry mix is thus avoided.

The high heat stability of the trimethylol propane itself, coupled with its lack of promotion of decomposition of the polyvinyl alcohol at elevated temperatures, enables the dry-blends to be compounded in a heated heavy-duty internal mixer, or to be extruded in the form of small rods which are then cut up into pellets, to give materials more suitable than the original dry-blend for the production of flaw-free films and other articles. Alternatively, the dry-blended material may be compressed at ambient temperatures into void-free pellets suitable for feeding to the final forming equipment.

Other materials such as auxiliary plasticisers, inert fillers, stabilisers which confer added stability at elevated temperatures, extrusion lubricants and mixtures thereof may also be added at any stage before the final forming operation. In particular, it is found that the incorporation of up to about 1% of a finely divided silica, such as those sold under the trade names "Cab-o-sil" and "Aerosil," facilitates the production of a free-flowing material after the dry-blend has been heated to allow the polyvinyl alcohol to absorb the melted trimethylol propane. While it is apparent that larger amounts of the silica may be incorporated, such larger amounts will, of course, impair the transparency of the resulting films or articles formed from the composition.

The invention will now be illustrated by the following examples in which all parts are by weight:

*Example I*

3 parts of trimethylol propane were added to 10 parts of a "partially hydrolysed" grade of polyvinyl alcohol sold under our registered trademark "Alcotex" 87/10, in which about 87% of the acetate groups originally present in the polyvinyl acetate from which it was derived have been replaced by hydroxyl groups, and a 4% aqueous solution of which has a viscosity of about 10 centistokes at 20° C. The mixture was stirred and warmed to about 100° C. for ten minutes and was then cooled down to room temperature, stirring being continued. There resulted a non-sticky granular material. After addition of 0.025 part of finely divided silica sold under the trade name "Cab-o-sil," the mixture was further stirred at room temperature. There was a rapid and marked improvement in the flow properties of the material, a high proportion of which was in the form of the individual particles originally present in the polyvinyl alcohol before addition of the plasticiser. A sample of the material was masticated for 10 minutes at 180° C. to give a fused drawable mass which on cooling set to a hard horny transparent mass of good colour, and which was readily soluble in both hot and cold water.

*Example II*

To 10 parts of "Alcotex" 87/10 were added 4 parts of trimethylol propane, and mixed by grinding the solids together in a mortar. A sample masticated at 180° C. for 10 minutes gave a less viscous melt which drew more readily than the material described in Example 1. A transparent, slightly flexible mass of very good colour was produced on cooling. No sign of plasticiser incompatibility was noted over a period of three weeks.

*Example III*

To 10 parts of "Alcotex" 87/10 were added 5 parts of trimethylol propane. A sample of the dry-blend, obtained as in Example II, was masticated at 180° C. for 10 minutes to give a more fluid mass than the material described in Example II. On cooling, a transparent mass of good colour was obtained which was more flexible than the cooled masticated material described in Example II. After 3 weeks, it showed slight signs of blooming-out of the plasticiser, indicating that the compatibility limit of this particular polyvinyl alcohol and the trimethylol propane had been exceeded.

*Example IV*

3 parts of trimethylol propane were added to 10 parts of "Alcotex" 75/L (a "partially hydrolysed" grade of polyvinyl alcohol in which about 75% of the acetate groups present in the polyvinyl acetate from which it was derived have been replaced by hydroxyl groups, and a 4% aqueous solution of which has a viscosity of about 6 centistokes at 20° C.). A sample of the dry-blend obtained as in Example II fused readily upon mastication at 180° C. for 10 minutes. A transparent mass of good colour resulted on cooling.

*Example V*

5 parts of trimethylol propane were added to 10 parts of "Alcotex" 99/10 (a "fully hydrolysed" grade of polyvinyl alcohol in which about 99.5% of the acetate groups present in the polyvinyl acetate from which it was derived have been replaced by hydroxyl groups, and a 4% aqueous solution of which has a viscosity of about 10 centistokes at 20°). A sample of the dry blend obtained as in Example II failed to yield an integrated mass upon mastication at 180° C. for 10 minutes.

*Example VI*

Portions of grades of "87% hydrolysed" polyvinyl alcohol, "Alcotex" 87/05, 87/08, 87/10, 87/15 and 87/20, the viscosities of whose 4% aqueous solutions measured at 20° C. were about 5, 8, 10, 15 and 20 centistokes respectively, were treated as in Example II. The difficulty of mastication of the plasticised polyvinyl alcohol was found to increase with its viscosity grade.

*Example VII*

One part of trimethylol propane was added to 10 parts of "Alcotex" 87/10 as in Example 1. A granular material resulted which had adequate flow properties without the addition of finely divided silica. The material was fed by a trickle feeder into the feed aperture of a small "adiabatic" screw extruder fitted with an extrusion head (of the type commonly used for the blow-extrusion of film in tubular form) which had been preheated to about 160° C., and the resulting tube was expanded in the usual way by internal air pressure before being collapsed and wound on a reel. It was found that there was little adhesion between the internal surfaces of the collapsed tube which could be opened readily.

Having thus described the invention, what is claimed as new and desired to be secured by Letters Patent, is:

1. A composition of matter comprising a polyvinyl acetate-derived polyvinyl alcohol in which from 75 to 90 of every 100 acetate groups originally present in the polyvinyl acetate from which the polyvinyl alcohol has been derived have been replaced by hydroxyl groups, and, as a plasticiser for said polyvinyl alcohol, trimethylol propane in an amount from about 5 to about 50 parts by weight of trimethylol propane for every 100 parts of said polyvinyl alcohol.

2. The composition of claim 1, wherein the trimethylol propane is present in an amount from 10 to 50 parts by weight of said polyvinyl alcohol.

3. The composition of claim 1, in the form of a dry powdery material.

4. The composition of claim 1, in the form of a dry granular material.

5. A composition of matter comprising a polyvinyl acetate-derived polyvinyl alcohol in which from said 75 to 90 of every 100 acetate groups originally present in the polyvinyl acetate from which the polyvinyl alcohol has been derived have been replaced by hydroxyl groups, from about 5 to about 50 parts by weight of trimethylol propane for every 100 parts of said polyvinyl alcohol, said trimethylol propane serving as a plasticiser for said polyvinyl alcohol, and, from a trace up to 1% of a finely divided silica.

6. The composition of claim 5, in the form of a dry flowable material.

7. The composition of claim 1 and further comprising a conventional additive for polyvinyl alcohol compositions selected from the group consisting of auxiliary plasticisers, inert fillers, stabilisers, extrusion lubricants and mixtures thereof.

8. A film of the composition of claim 1.

9. A film of the composition of claim 5.

10. An article made by the blow extrusion of the composition of claim 1.

11. An article made by the blow extrusion of the composition of claim 5.

12. An article made by the blow extrusion of the composition of claim 7.

13. A method of preparing a plasticised polyvinyl alcohol composition comprising the steps of mixing in the dry state a polyvinyl acetate-derived polyvinyl alcohol in which from 75 to 90 of every 100 acetate groups originally present in the polyvinyl acetate from which the polyvinyl alcohol has been derived have been replaced by hydroxyl groups and from about 5 to about 50 parts by weight of trimethylol propane for every part of said polyvinyl alcohol, and slowly heating the mixture at a temperature above the melting point of trimethylol propane while keeping the mixture in motion.

14. A method of preparing a plasticised polyvinyl alcohol composition comprising the steps of mixing in the dry state a polyvinyl acetate-derived polyvinyl alcohol in which from 75 to 90 of every 100 acetate groups originally present in the polyvinyl acetate from which the polyvinyl alcohol has been derived have been replaced by hydroxyl groups and from about 5 to about 50 parts by weight of trimethylol propane for every part of said polyvinyl alcohol, slowly heating the mixture at a temperature above the melting point of trimethylol propane while keeping the mixture in motion, extruding the resulting dry flowable material to form rods, and cutting up said rods to form pellets.

15. A method of preparing a plasticised polyvinyl alcohol composition comprising the steps of mixing in the dry state a polyvinyl acetate-derived polyvinyl alcohol in which from 75 to 90 of every 100 acetate groups originally present in the polyvinyl acetate from which the polyvinyl alcohol has been derived have been replaced by hydroxy groups and from about 5 to about 50 parts by weight of trimethylol propane for every part of said polyvinyl alcohol, slowly heating the mixture at a temperature above the melting point of trimethylol propane while keeping the mixture in motion, and compressing the resulting dry flowable material to form pellets.

References Cited in the file of this patent

Rubber Age, "Studies of Thermosetting Polyvinyl Alcohol Systems" (Brown), November 1952, pages 211–214 relied on.